United States Patent
Keith et al.

(10) Patent No.: US 12,117,617 B1
(45) Date of Patent: Oct. 15, 2024

(54) SYSTEM INCLUDING LIGHT EMITTER AND SENSOR ASSEMBLY HAVING CONVERSION LAYER

(71) Applicant: Rockwell Collins, Inc., Cedar Rapids, IA (US)

(72) Inventors: Christopher A. Keith, Wilsonville, OR (US); Brandon E. Wilson, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/229,355

(22) Filed: Aug. 2, 2023

(51) Int. Cl.
G09G 5/00 (2006.01)
G02B 27/00 (2006.01)
G02B 27/01 (2006.01)
H04N 23/11 (2023.01)
H04N 23/55 (2023.01)

(52) U.S. Cl.
CPC ..... G02B 27/0172 (2013.01); G02B 27/0093 (2013.01); H04N 23/11 (2023.01); H04N 23/55 (2023.01); G02B 2027/0138 (2013.01)

(58) Field of Classification Search
CPC ............. G02B 27/0093; G02B 27/01; G02B 27/0101; G02B 27/0138; G02B 27/017; G02B 27/0172; G06F 3/012; G06F 3/013; H04N 23/11; H04N 23/55
See application file for complete search history.

(56) References Cited

U.S. PATENT DOCUMENTS

| 6,061,916 | A | 5/2000 | Stevens et al. |
| 7,401,920 | B1 * | 7/2008 | Kranz ................ G02B 27/0093 |
| | | | 382/117 |
| 8,389,958 | B2 | 3/2013 | Vo-Dinh et al. |

(Continued)

FOREIGN PATENT DOCUMENTS

| CN | 100570204 C | * | 12/2009 |
| EP | 2718659 A1 | | 4/2014 |

OTHER PUBLICATIONS

Department of Defense Interface Standard, Lighting, Aircraft, Night Vision Imaging System (NVIS) Compatible; MIL-STD-3009; Feb. 2, 2001. http://www.everyspec.com.

(Continued)

*Primary Examiner* — Joe H Cheng
(74) *Attorney, Agent, or Firm* — Suiter Swantz IP

(57) ABSTRACT

The system may include at least one a light emitter configured to emit light over a range of wavelengths onto an environment and at least one sensor assembly. The range of wavelengths emitted by the light emitter may be of wavelengths that are above or below wavelengths used by a night vision imaging system. The sensor assembly may include an image sensor and conversion layer. The image sensor may capture images of the environment illuminated by the light emitters and sense light in a given range of wavelengths. The conversion layer may receive the emitted light and convert the emitted light to converted light with a wavelength within the given range of wavelengths associated with the image sensor. The image sensor may be further configured to receive the converted light from the conversion layer, capture an image of the light emitter and output image data associated with the captured image.

20 Claims, 13 Drawing Sheets

(56) References Cited

U.S. PATENT DOCUMENTS

| | | | | |
|---|---|---|---|---|
| 8,717,481 | B2* | 5/2014 | Kamiya | G02B 27/017 |
| | | | | 348/148 |
| 8,730,581 | B2* | 5/2014 | Schon | G02B 27/1006 |
| | | | | 359/630 |
| 9,648,255 | B2* | 5/2017 | Chenderovich | H04N 5/265 |
| 10,218,926 | B2* | 2/2019 | Nicholson | H04N 23/63 |
| 10,539,788 | B2* | 1/2020 | Shrubsole | G06F 3/013 |
| 10,754,142 | B2 | 8/2020 | Conley | |
| 11,249,546 | B2 | 2/2022 | Foote et al. | |
| 11,768,374 | B1* | 9/2023 | Stratton | G02B 27/0179 |
| | | | | 345/8 |
| 2007/0218428 | A1* | 9/2007 | Taffet | G09B 9/16 |
| | | | | 434/41 |

OTHER PUBLICATIONS

Edmund Optics; 1460-1600nm Near-Infrared Camera; https://www.edmundoptics.com/f/1460-1600nm-near-infrared-camera/12779/#.

Edmund Optics; 1500-1600nm NIR CCD USB 2.0 Camera; https://www.edmundoptics.com/p/nir-ccd-usb-2-camera/29505/.

Multispectral Imaging with LEDs and Phosphors; https://phosphortech.com/multispectral-imaging-with-leds-and-phosphors/ (2023).

* cited by examiner

SYSTEM INCLUDING LIGHT EMITTER AND SENSOR ASSEMBLY HAVING CONVERSION LAYER

BACKGROUND

Typical optical tracking systems use near infrared (NIR) light that is just outside the visual spectrum of which humans can detect, making them suitable for many applications. Such typical optical tracking systems allow optical tracking to track without humans perceiving the light from the optical tracking system. In dark environments, an existing night vision imaging system (NVIS) may be used to assist a user to see by using near infrared (NIR) light. Since both typical optical tracking systems and NVISs use NIR light, the two systems may interfere with each other. For example, the NIR light used in the tracking system may oversaturate a night vision sensor of the NVIS and wash out an environment that that is being sensed. Further, an NVISs may also detect light from optical tracking systems, which can make such NVISs sub-optimal for use in convert operations, where such NIR light can potentially be detected by adversaries. There are some tracking systems that use light outside of NIR, such as short-wave infrared (SWIR) light, but the sensors capable of detecting SWIR light are costly and low in resolution when compared to NIR sensors and visible light sensors.

SUMMARY

In one aspect, embodiments of the inventive concepts disclosed herein are directed to a system. The system may include at least one sensor assembly at least one a light emitter configured to emit light over a range of wave lengths onto an environment. The range of wavelengths emitted by the light emitter may be of wavelengths that are above or below night vision imaging system (NVIS)-compatible wavelengths used by a NVIS. The sensor assembly may include an image sensor and a conversion layer. The image sensor may be configured to capture images of the environment illuminated by the at least one light emitter and sense light in at least one given range of wavelengths. The conversion layer may receive the emitted light and up-convert or down-convert the emitted light to converted light with a wavelength within the given range of wavelengths associated with the image sensor. The image sensor may be further configured to receive the converted light from the conversion layer, capture an image of the light emitter and output image data associated with the captured image.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
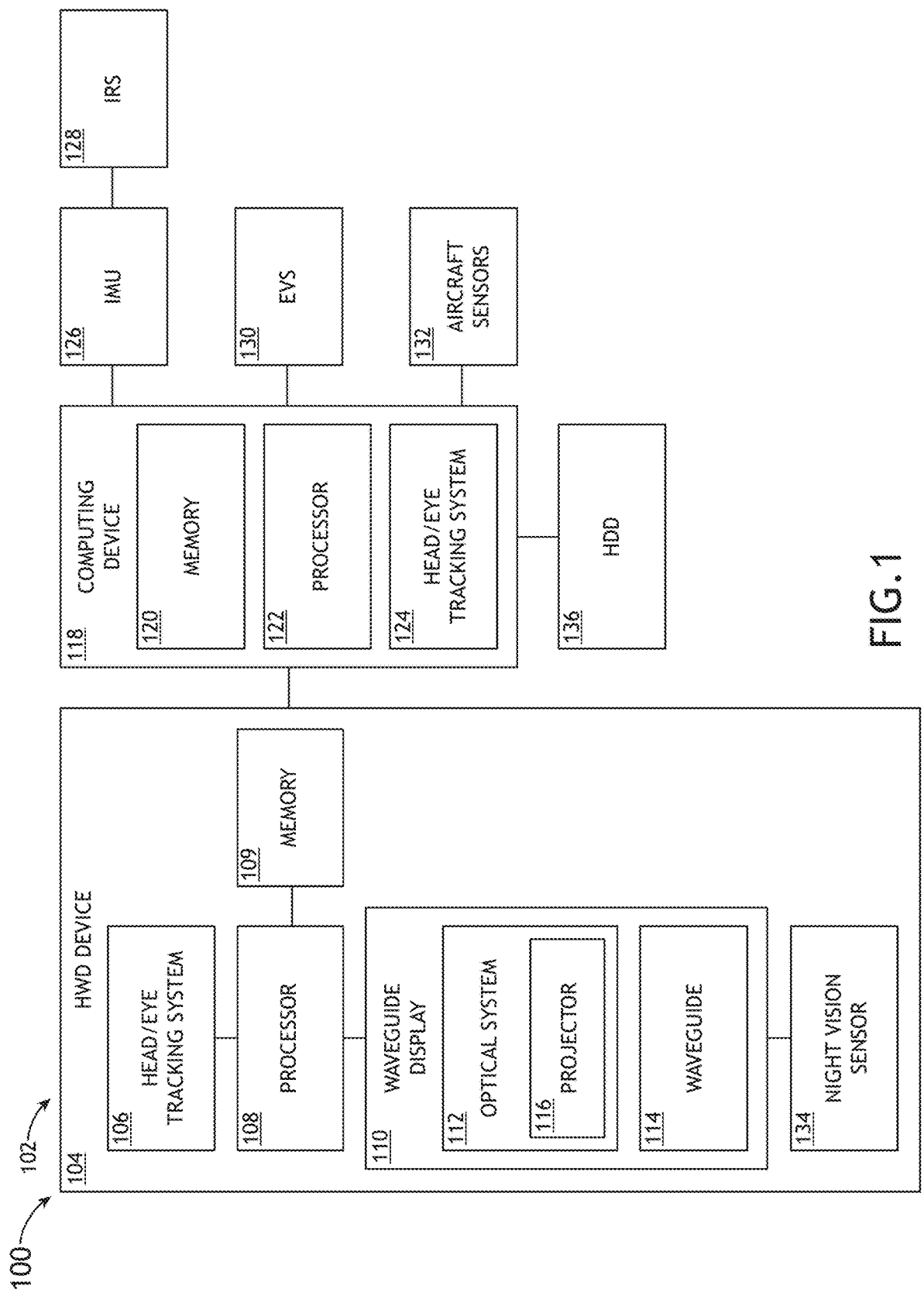
FIG. 1 is a view of an exemplary embodiment of a system including an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system, which may include at least one light emitter and at least one sensor assembly having at least one sensor and at least one conversion layer (e.g., configured to up-convert and/or down-convert emitted light from light emitter(s)). In some embodiments, the system may include a night vision sensor (e.g., of a night vision imaging system (NVIS)), and each of the at least one light emitter may be configured to only emit light at wavelengths at least one of above or below a NVIS-detectable range of wavelengths. In some embodiments, the at least one light emitter and the at least one sensor assembly may be a part of a tracking system (e.g., a NVIS compatible head and/or eye tracking system), which may be less expensive than current NVIS-compatible tracking systems. For example, the tracking system may include a sensor assembly (e.g., which may include a conversion layer and an image sensor), at least one light emitter configured to emit light at wavelengths above and/or below a range of wavelengths (e.g. wavelengths of the Near Infrared (NIR) and/or visible light spectrum) used by the NVIS, and/or a processor configured to receive image data from the sensor assembly, track movement of a head and/or an eye(s) of a user based on the image data, and/or output a head and/or eye tracking system data. In some embodiments, the at least one sensor assembly may include: at least one image sensor configured to: detect light having a given range of wavelengths (e.g., visible light) and/or capture an image; and at least one conversion layer that may be configured to convert light wavelengths from above or below the NVIS-detectable range of wavelengths to a given range of wavelengths detectable by the image sensor. The light emitted by the light emitters may illuminate an environment (e.g., a cockpit of an aircraft and/or a face of a pilot), wherein the sensor assembly may convert, detect, and/or capture an image of the emitted light.

In some embodiments, some or all of the tracking system may be included within and/or on a head-wearable device (HWD) (e.g., a head-wearable display device, such as a helmet-mounted display (HMD)) and/or may be implemented in proximity to eye(s) of a user (e.g., a pilot).

Referring now to FIGS. 1, 2, 3, 4, 5A, 5B, 6, 7B, 8, 9A, 9B, 10, 11A, 11B, 12, 13A, and 13B, exemplary embodiments of a system 100 according to the inventive concepts disclosed herein are depicted. The system 100 may be implemented as any suitable system, such as at least one vehicle (e.g., an aircraft 102, a spacecraft, an automobile, a watercraft, a submarine, or a train). For example, as shown in FIG. 1, the system 100 may include an aircraft 102. For example, aircraft 102 may include at least one head-wearable device (e.g., a head-wearable display (HWD) device 104), at least one computing device 118, at least one inertial measurement unit (IMU) 126, at least one inertial reference system (IRS) 128, at least one enhanced vision system (EVS) 130, at least one display (e.g., at least one head-down display (HDD) 136), and/or aircraft sensors 132, some or all of which may be communicatively coupled at any given time.

In some embodiments, the head-wearable device (e.g., the HWD device 104) may include at least one head and/or eye tracking system 106, at least one processor 108, at least one memory 109, and/or at least one display (e.g., at least one waveguide display 110, at least one light emitting diode (LED) display, and/or at least one liquid crystal display (LCD)), some or all of which may be optically and/or communicatively coupled at any given time. For example, the waveguide display 110 may include at least one optical system 112, and/or at least one waveguide 114, some or all of which may be optically and/or communicatively coupled at any given time.

The head and/or eye tracking system 106 may have optical, magnetic, and/or inertial tracking capability. In some embodiments, the head and/or eye tracking system 106 may include head and/or eye tracking capabilities and/or be coordinated with head and/or eye tracking capabilities of another head and/or eye tracking system (e.g., 124), for example, such that the head and/or eye tracking operations are relative to a position and/or orientation of a user and/or relative to a position and/or orientation to a vehicle (e.g., the aircraft 102). For example, the head and/or eye tracking system 106 may be configured to track a direction of where a field of view (FOV) through the waveguide display 110 is pointing. For example, if the waveguide display 110 is mounted to the HWD device 104, this direction may be a direction that a head is pointing that is being tracked.

Figure 2:
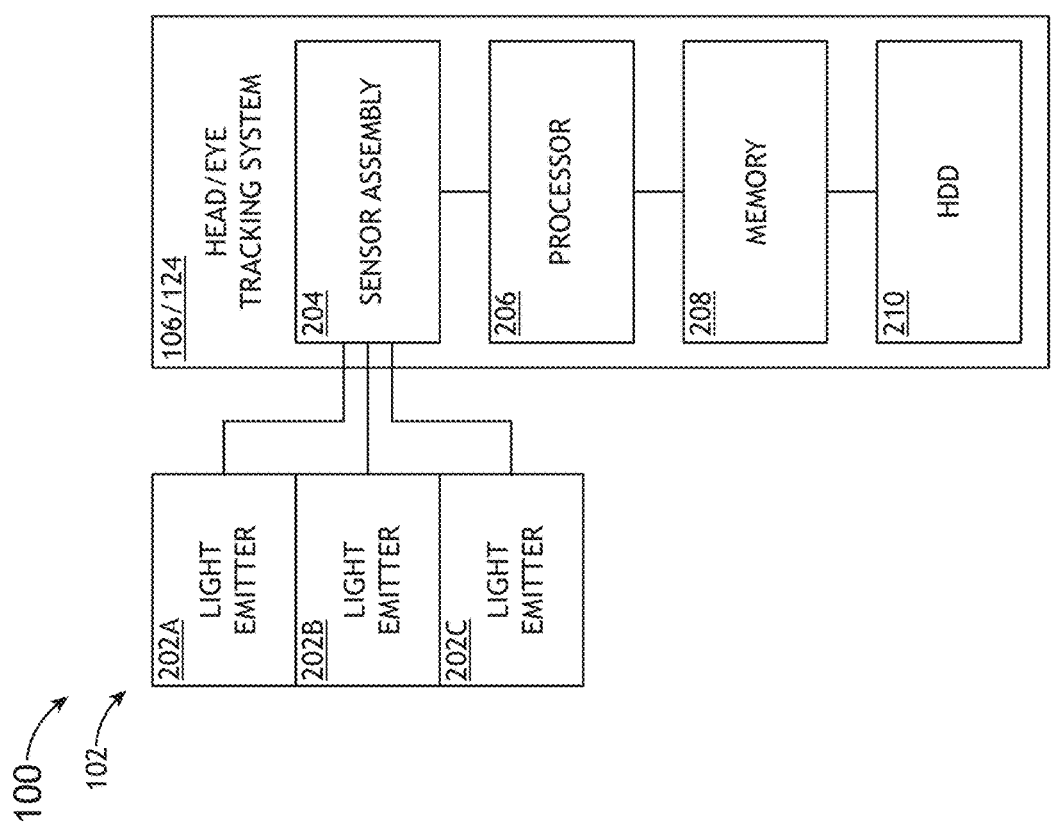
FIG. 2 is a view of a portion of an exemplary embodiment of the aircraft of FIG. 1 according to the inventive concepts disclosed herein.

The head and/or eye tracking system 106 may include at least one sensor assembly 204, at least one processor 206, at least one memory 208, and/or at least one storage device 210, as well as other components, equipment, and/or devices commonly included in a head and/or eye tracking system, some or all of which may be communicatively coupled at any time, as shown in FIG. 2. The head and/or eye tracking system 106 may be configured to sense emitted light, such as from the light emitters 202A, 202B, 202C.

The at least one processor 206 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout.

The head and/or eye tracking system 106 and/or 124 may be configured to determine and track a position and/or an orientation of a user's head relative to an environment (e.g., an aircraft 102 and/or the earth). The head and/or eye tracking system 106 and/or 124 may be configured for performing fully automatic head and/or eye tracking operations in real time. The processor 206 of the head and/or eye tracking system 106 may be configured to process data received from the at least one sensor assembly 204 and output processed image data (e.g., head and/or eye tracking data) to one of the computing devices of the system and/or the processor 108 for use in generating images aligned with the user's field of view, such as augmented reality or virtual reality images aligned with the user's field of view to be displayed by the waveguide display 110. For example, the processor 206 may be configured to: receive the image sensor image data (e.g., from the image sensor(s) 304); based at least on the image sensor image data, determine a position and/or orientation of the head wearable display device 104; and/or determine and track a position and/or orientation of a user's head relative to an environment (e.g., an aircraft 102 and/or the earth). Additionally, for example, the processor 206 may be configured to: generate position and orientation data associated with such determined information and output the generated position and orientation data. The processor 206 may be configured to run various software applications or computer code stored in a non-transitory computer-readable medium (e.g., memory 208 and/or storage device 210) and configured to execute various instructions or operations. In some embodiments, the at least one processor 206 may be implemented as a special purpose processor configured to execute instructions for performing (e.g., collectively performing if more than one processor) any or all of the operations disclosed throughout.

The at least one processor 108 may be implemented as any suitable processor(s), such as at least one general purpose processor, at least one central processing unit (CPU), at least one image processor, at least one graphics processing unit (GPU), and/or at least one special purpose processor configured to execute instructions for performing (e.g., collectively performing if more than one processor) any or all of the operations disclosed throughout. In some embodiments, the processor 108 may be communicatively coupled to the waveguide display 110. For example, the processor 108 may be configured to: receive head and/or eye system tracking data; receive image data from the computing device 118; generate and/or output image data to the waveguide display 110 and/or to the optical system 112, for example, based on the head and/or eye tracking system data; generate and/or output augmented reality and/or virtual reality image data to waveguide display 110 and/or the optical system 112, for example, based on the head and/or eye tracking system data; and/or generate and/or output other image data, which may include vehicle operation (e.g., aircraft 102) information, symbology, navigation information, tactical information, and/or sensor information to the waveguide display 110 and/or the optical system 112, for example, based on the head and/or eye tracking system data.

The waveguide display 110 may be implemented as any suitable waveguide display. For example, the waveguide display 110 may be configured to: display the images aligned with the field of view of the user based at least on the determined position and the determined orientation of the head wearable display device. The waveguide display 110 may be implemented in or on the head wearable display device 104. The waveguide display 110 may include the at least one optical system 112 and/or at least one waveguide 114. For example, the optical system 112 may include at least one processor, at least one collimator, and/or at least projector 116. The optical system 112 may be configured to: receive image data corresponding to an image; and/or project images at least through the waveguide 114 to be displayed to the user. In some embodiments, the waveguide 116 may be a diffractive, mirror, or beam splitter based waveguide. In some embodiments, the waveguide display 110 may include at least one lens, at least one mirror, diffraction gratings, at least one polarization sensitive component, at least one beam splitter, the at least one waveguide 114, at least one light pipe, at least one window, and/or the projector 116.

The optical system 112 may be configured to receive image data from the processor 108 and project images through the waveguide 114 for display to the user.

In some embodiments, the head wearable display device 104 may include a second waveguide display 110 including a second waveguide 114 and a second optical system 112, wherein the second optical system 112 is configured to: receive the image data corresponding to the image and project the image at least through the second waveguide to be displayed to the user. In some embodiments, the waveguide display 110 is one of a left eye waveguide display or a right eye waveguide display, wherein the second waveguide display 110 is another of the left eye waveguide display or the right eye waveguide display.

The computing device 118 may be implemented as any suitable computing device, such as an avionics computing device. The computing device 118 may include at least one memory 120, at least one processor 122, and/or at least one head and/or eye tracking system 124, some or all of which may be communicatively coupled at any given time.

The at least one processor 122 may be implemented as any suitable processor(s), such as at least one general purpose processor, at least one central processing unit (CPU), at least one FPGA, at least one image processor, at least one graphics processing unit (GPU), and/or at least one special purpose processor configured to execute instructions for performing (e.g., collectively performing if more than one processor) any or all of the operations disclosed throughout. For example, the processor 122 may be configured to: receive IMU data from the IMU 126 and/or IRS data from the IRS 128; receive EVS image data from the EVS 130; and/or receive aircraft sensor data from the aircraft sensors 132; receive head and/or eye system tracking data; generate and/or output image data to the waveguide display 110 and/or to the optical system 112, for example, based on the head and/or eye tracking system data; generate and/or output augmented reality and/or virtual reality image data to waveguide display 110 and/or the optical system 112, for example, based on and/or the head and/or eye tracking system data; and/or generate and/or output other image data, which may include vehicle operation (e.g., aircraft) information, symbology, navigation information, tactical information, and/or sensor information to the waveguide display 110 and/or the optical system 112, for example, based on the head and/or eye tracking system data.

Figure 3:
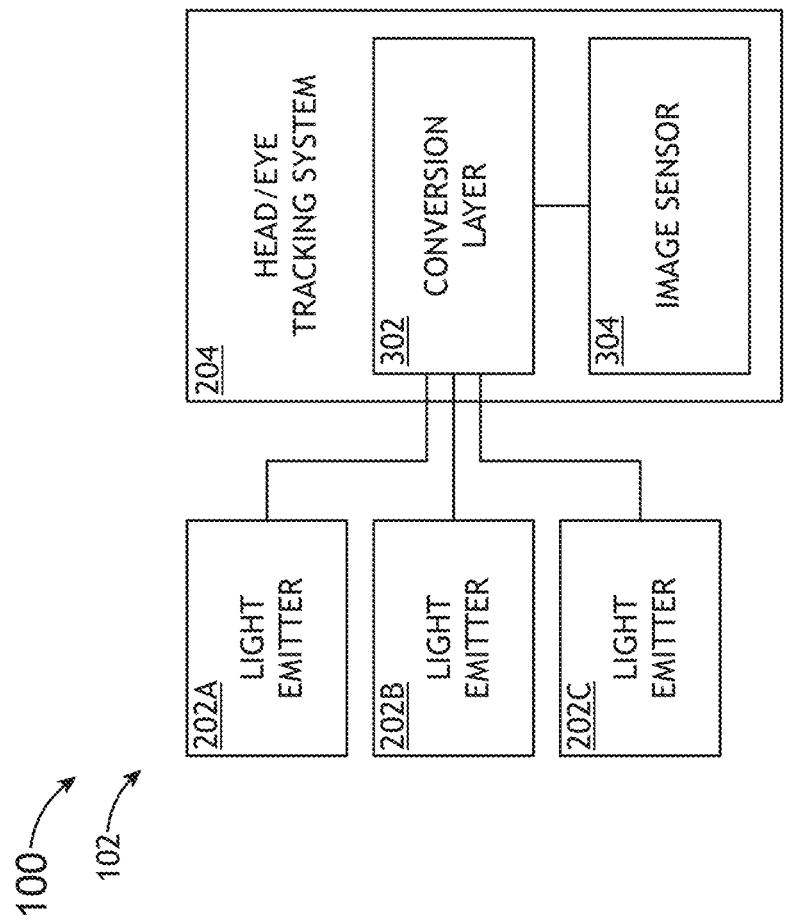
FIG. 3 is a view of a portion of another exemplary embodiment of the aircraft of FIG. 1 according to the inventive concepts disclosed herein.

The head and/or eye tracking system 106/124 may have optical, magnetic, and/or inertial tracking capability. In some embodiments, the head and/or eye tracking system 124 may include head and/or eye tracking capabilities and/or be coordinated with head and/or eye tracking capabilities of another head and/or eye tracking system (e.g., 106), for example, such that the head and/or eye tracking operations are relative to a position and/or orientation of a user and/or relative to a position and/or orientation to a vehicle (e.g., the aircraft 102). For example, the head and/or eye tracking system 124 may be configured to track a direction of where a field of view (FOV) through the waveguide display 110 is pointing. For example, if the waveguide display 110 is mounted to the HWD device 104, this direction may be a direction that a head is pointing that is being tracked. The head and/or eye tracking system 106 may include at least one sensor assembly 204, at least one processor 206, at least one memory 208, and/or at least one storage device 210, as well as other components, equipment, and/or devices commonly included in a head and/or eye tracking system, some or all of which may be communicatively coupled at any time, as shown in FIG. 3. The at least one processor 206 may be implemented as any suitable processor(s), such as at least one general purpose processor, at least one central processing unit (CPU), at least one image processor, at least one graphics processing unit (GPU), at least one field-programmable gate array (FPGA), and/or at least one special purpose processor configured to execute instructions for performing (e.g., collectively performing if more than one processor) any or all of the operations disclosed throughout. The head and/or eye tracking system 106/124 may be configured to determine and track a position and an orientation of a user's head relative to an environment (e.g., an aircraft 102). The head and/or eye tracking system 106/124 may be configured for performing fully automatic head and/or eye tracking operations in real time. The processor 206 of the head and/or eye tracking system 106/124 may be configured to process data received from the sensor assembly 204 and output processed image data (e.g., head and/or eye tracking data) to one of the computing devices of the system and/or the at least one processor (e.g., 108, 206, and/or 122) for use in generating images aligned with the user's field of view, such as augmented reality or virtual reality images aligned with the user's field of view to be displayed by the waveguide display 110. For example, the processor 206 may be configured to: determine and track a position and orientation of a user's head relative to an environment (e.g., an aircraft 102). The processor 206 may be configured to receive IMU data from the IMU 126 and/or IRS data from the IRS 128. Additionally, for example, the processor 206 may be configured to generate position and orientation data associated with such determined information and output the generated position and orientation data. The processor 206 may be configured to run various software applications or computer code stored in a non-transitory computer-readable medium (e.g., memory 208 and/or storage device 210) and configured to execute various instructions or operations. In some embodiments, the at least one processor 206 may be implemented as a special purpose processor configured to execute instructions for performing (e.g., collectively performing if more than one processor) any or all of the operations disclosed throughout.

In some embodiments, some or all of the at least one processor (e.g., at least one processor 108, at least one processor 206, and/or at least one processor 122) may be implemented in the head wearable display device 104 and/or in a computing device 118 (e.g., separate from the head wearable display device 104), wherein the at least one processor (e.g., 108 and/or 122) may be configured to perform (e.g., collectively configured to perform, if more than one processor) any of the operations disclosed throughout. For example, the at least one processor may include at least one head wearable display device processor 108, at least one at least one computing device processor 122, and/or at least one head and/or eye tracking system processor 206, which may be collectively configured to perform any or all of the operations disclosed throughout.

In some embodiments, the head and/or eye tracking system may be used in conjunction with at least one Night Vision Imaging System (NVIS). The NVIS system may include at least one night vision sensor 134. The NVIS may amplify and enhance images of an environment which has little visible light (e.g., a dark environment) by detecting and/or amplifying light (e.g., infrared light (e.g., near infrared (NIR) light)) illuminating the environment. A range of light wave lengths that may be detected by the NVIS may be referred to as a NVIS-detectable range of wavelengths. For example, NVIS-detectable wavelengths may be and/or may include NIR wavelengths between 0.75-1 micrometers (μm) and visible light. Department of Defense Interface Standard, "Lighting, Aircraft, Night Vision Imaging System (NVIS) Compatible", MIL-STD-3009, issued Feb. 2, 2001, is incorporated by reference in its entirety. For example, according to MIL-STD-3009, NVIS sensors are typically much more sensitive in the red portion of the visible spectrum as well as part of the Near Infrared Region; typically, NVIS sensor sensitivity significantly starts to drop around 900 nm and is negligible above 1,000 nm. Further, for example, visible spectrum sensors are typically sensitive over approximately 400 to 900 nm. In some embodiments, wavelengths greater than 1,000 nm may not be detected by an NVIS, and emitters greater than 1,000 nm can be used to stimulate a conversion layer inside a sensor assembly.

Figure 4:
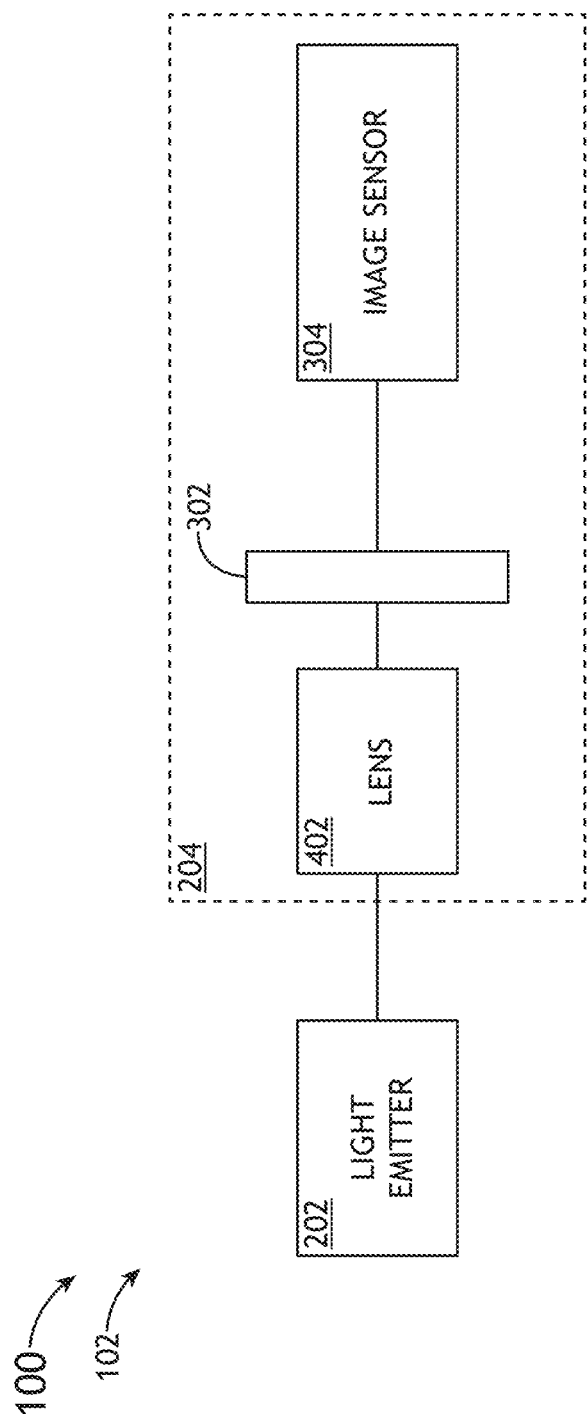
FIG. 4 is a view of another portion of another exemplary embodiment of the aircraft of FIG. 1 according to the inventive concepts disclosed herein.

Now referring to FIGS. 3 and 4, in some embodiments the at least one sensor assembly 204 may include at least one image sensor 304 (e.g., configured to capture images of an environment and/or detect light waves over a range of wavelengths (e.g., 500-800 nanometers (nm))) and/or a conversion layer 302 configured to convert light wavelengths above and/or below such NVIS-compatible wavelengths of light (e.g. short-wave infrared (SWIR) light and/or ultraviolet (UV) light) into a range of wavelengths detectable by the image sensor 304. For example, the environment may be illuminated by light emitted from at least one light emitter 202 (e.g., at least one SWIR light emitting diode (LED) and/or at least one UV LED) configured to emit (e.g., only emit) light above and/or below the NVIS-detectable range of wavelengths (e.g., SWIR and/or UV). The NVIS-detectable range of wavelengths may include wavelengths that are utilized by a NVIS (e.g., such as in the near infrared (NIR) between 0.75-1 μm and/or the visible light spectrum). The emitted light may illuminate an environment (e.g., e.g., a cockpit of an aircraft 102, an eye 1202, and/or a HWD device 104) and be received by the conversion layer 302.

Figure 10:
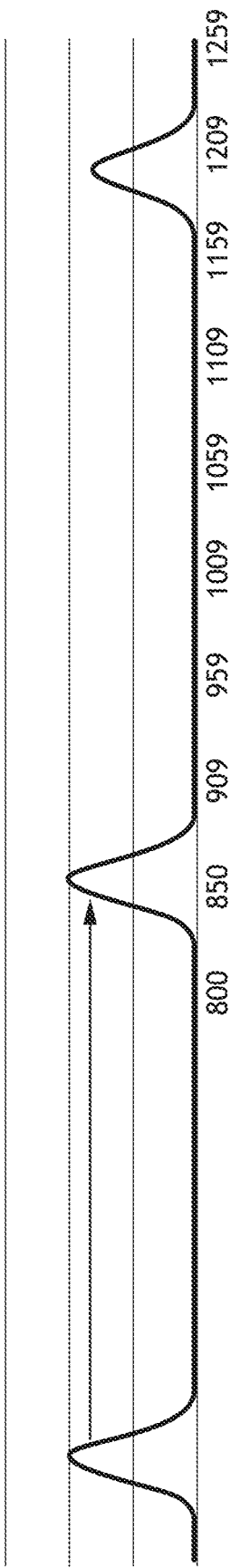
FIG. 10 is a diagram associated with an exemplary embodiment associated with up-conversion according to the inventive concepts disclosed herein.

In some embodiments, the conversion layer 302 may receive the emitted light from the at least one light emitter 202. As the emitted light passes through the conversion layer 302, the emitted light may undergo photon conversion, wherein the energy of one wavelength is converted to a different wavelength, such as through a process of absorption and re-emission. Referring to FIG. 10, in some embodiments, the conversion layer 302 may convert low frequency light to high frequency light (e.g., SWIR to visible light), herein referred to as up-conversion. For example, a conversion layer 302 that is an up-conversion layer may require two photons from low frequency light (e.g., SWIR) in order to convert the light to high frequency light (e.g., visible light) and have a theoretical maximum efficiency (e.g., quantum yield efficiency) of 50%. In some embodiments, a conversion layer 302 of up-conversion may have an efficiency of 5%. In some embodiments, the conversion layer 302 may convert high frequency light waves to low frequency light waves (e.g., UV light to visible light), herein referred to as down-conversion. For example, a conversion layer 302 of down conversion, may only require one photon from high frequency light (e.g., UV) to convert the light to low frequency light (e.g., visible light). In embodiments, a conversion layer 302 of down conversion may have an efficiency up to 95%. The conversion layer 302 may convert the emitted light into converted light which may be within a range of wavelengths detectable by the image sensor 304. The converted light may then be received by the image sensor 304.

Figure 11B:
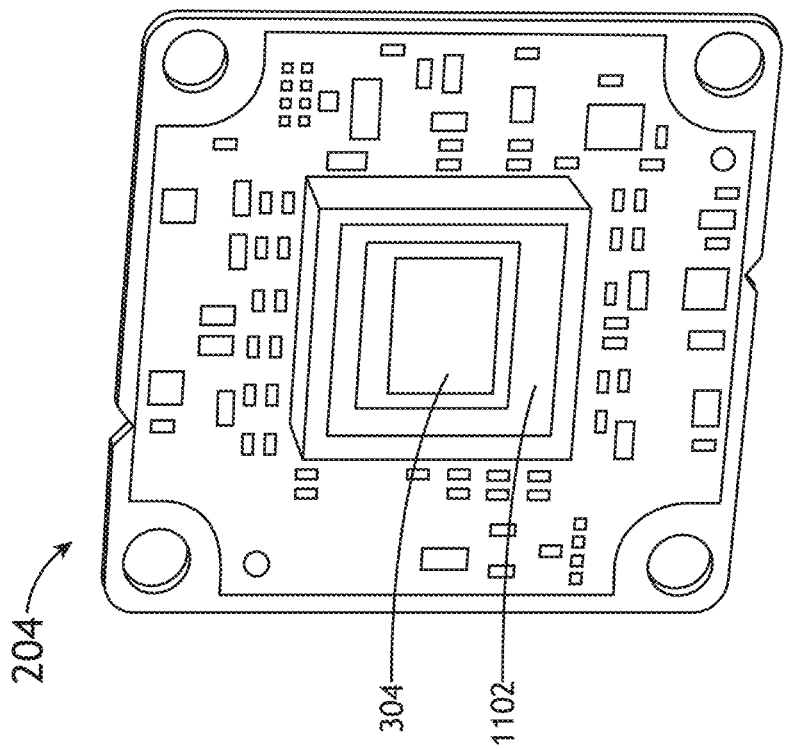
FIG. 11B is a view of an exemplary embodiment showing a glass cover as a conversion layer according to the inventive concepts disclosed herein.
Figure 11A:
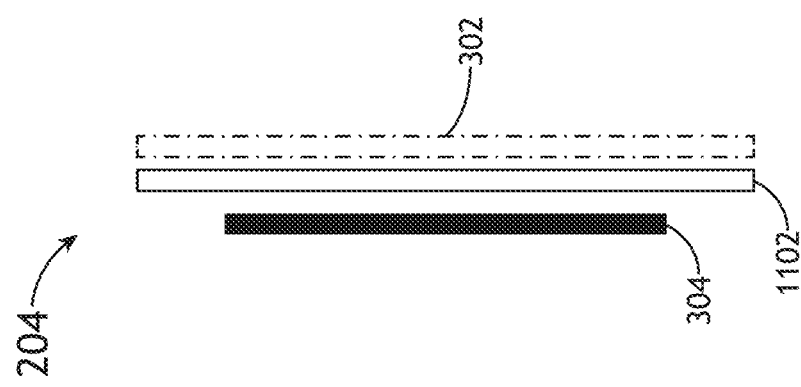
FIG. 11A is a view of an exemplary embodiment showing a conversion layer deposited on or adhered to a cover glass according to the inventive concepts disclosed herein.

As illustrated in FIG. 11A, in some embodiments the conversion layer 302 may be deposited on or adhered to a cover glass 1102 which may be configured to cover an image sensor 304. For example, the conversion layer 302 deposited on or adhered to the cover glass 1102 may be at least one of phosphors (e.g., which may be 5-20 micron semi-spherical particles), nano-particles, and/or other materials able to convert light waves. In some embodiments, the conversion layer 302 may be a film adhered to the cover glass 1102. For example, the film may be an up-conversion film (e.g., a film capable of converting IR (1200 nm) to visible light (525-575 nm)) and/or a down conversion film (e.g., a film capable of converting UV (325-367 nm) to visible light (525-620 nm)). For example, the film may be adhered to the cover glass by using an optically clear pressure sensitive adhesive. In some embodiments, surface materials may be added to the phosphors to improve efficiency; for example, such surface materials may include microstructures (e.g., microlenses or other shapes to condense light into a smaller area on the conversion layer) deposited onto or grown on the conversion layer. Further, the cover glass 1102 may be etched first to incorporate optical structures, such as waveguides, microlenses or other structure types, to increase the efficiency of the light collection from the phosphor that may be deposited on the etched surface. In some embodiments the conversion layer 302 may be the cover glass 1102 (e.g., a nanocrystal-doped glass) configured to cover an image sensor 304 as illustrated in FIG. 11B.

In some embodiments, where the conversion layer 302 is a down-conversion layer, the at least one light emitter 202 may be and/or may include at least one mercury lamp, at least one excimer lamp, at least one UV LED (e.g., a 265 nm UV-C LED (where UV-C denotes a spectrum of 100 nm to 280 nm within the UV spectrum of 100 nm to 400 nm)), and/or a cathode luminescence-(CL) based deep ultraviolet (DUV) chip (e.g., which may emit light as low as 200 nm, in the UV spectrum). In some embodiments, the conversion layer 302 may include a black matrix (e.g., a matrix of black absorbing material that may be interspersed in the conversion layer to prevent light leakage from one group of phosphor to another group) or nano/sub-micro size phosphor. For example, a conversion layer of bigger phosphors (e.g., 15-25 microns) may be associated with an increase in efficiency.

In some embodiments, the image sensor 304 may be configured to sense light in at least one range of wavelengths (e.g., 500-800 nm and/or the visible light spectrum); capture images of the illuminated environment; and/or output image data associated with the captured image(s). The image sensor 304 may be configured to receive the converted light from the conversion layer 302. In some embodiments, the image sensor may be able to detect a range of wavelengths, such as approximately 400-500 nm.

Figure 13B:
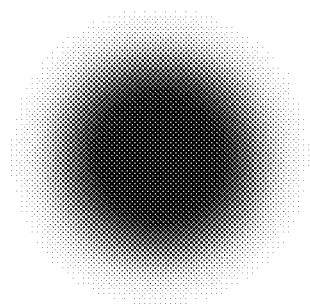
FIG. 13B is an exemplary embodiment associated with a blurred image formed on an image sensor with a conversion layer according to the inventive concepts disclosed herein.
Figure 13A:
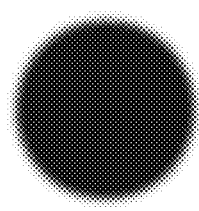
FIG. 13A is an image formed on an image sensor lacking a conversion layer according to the inventive concepts disclosed herein.

In some embodiments, as light (e.g., emitted light or converted light) passes through a conversion layer 302, the conversion layer 302 may absorb the light and re-emit in all directions. Because the light may re-emit in all directions, the converted light may be received by the image sensor 304 and captured as a captured image having blurred imagery. For example, the closer that the conversion layer 302 is in proximity the image sensor 304, the clearer (e.g., less blurred) the image may be. FIG. 13A illustrates an exemplary captured image formed directly on the image sensor 304 without a conversion layer 302. FIG. 13B illustrates the blurred imagery that may be caused by the addition of the conversion layer 302.

In some embodiments, at least one processor 206 may receive the image data associated with the captured image that includes blurred imagery caused by a conversion layer 302. The processor 108 may be configured to determine the center of the blurred imagery using at least one center of mass calculation. In some embodiments, the at least one center of mass calculation may include pixel intensity analysis, where the intensity values of the blurred imagery may be analyzed to find a weighted center of the of the blurred imagery. In some embodiments, the calculated center of the blurred imagery may be the same as a center of an image lacking blur. For example, calculating the center of the blurred imagery may permit the head and/or eye tracking system 106 to use blurred imagery and still have capabilities to: determine a position and orientation of the HWD device 104; and/or determine and track a position and orientation of a user's head relative to an environment (e.g., a cockpit of an aircraft 102).

Figure 6:
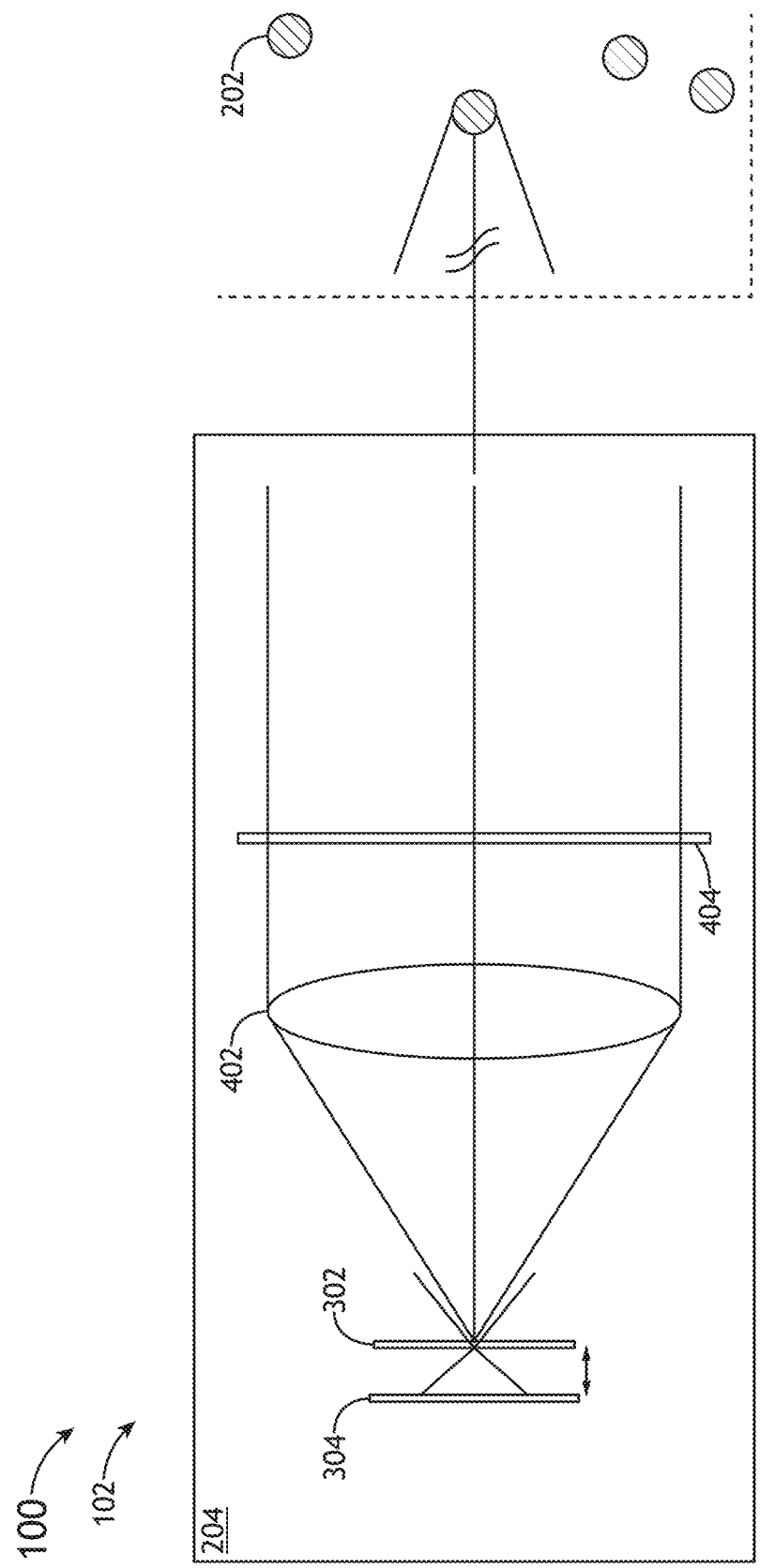
FIG. 6 is a view of an exemplary embodiment of a sensor assembly having a lens according to the inventive concepts disclosed herein.

In some embodiments, the sensor assembly 204 may include at least one lens 402 (e.g., an imaging lens) configured to focus emitted light and/or converted light. As illustrated in FIG. 6, for example, a conversion layer 302 may be positioned between an image senor 304 and a lens 402. The lens 402 may focus emitted light to a focal plane associated with image sensor 304. The image sensor 304 may have a focal plane, where a focused image may be received. In some embodiments, it may be advantageous to locate the conversion layer 302 as close to the focal plane of the image sensor 304 as possible in order to minimize a blurred effect, which may be caused by the conversion layer 302 absorbing the emitted light and re-emitting it in all directions. Some embodiments may include a filter 404 positioned before or after the lens 402. For example, the lens 402 may be positioned between the conversion layer 302 and the filter 404. In some embodiments, the filter 404 may allow longer light wavelengths (e.g., longer wavelengths of SWIR light) to pass into the lens 402 but prevent shorter wave lengths (e.g., shorter wavelengths of visible light) from entering the sensor assembly 204 past the filter 404 into the environment. For example, this may prevent any converted light from leaking into the environment and potentially interfering with the night vision sensor 134 of the NVIS. For example, the filter 404 may also improve the signal to noise ratio of detecting the emitters; for example, SWIR emitters may be surrounded by visible light in some cases, and the lens 402 might accept visible and SWIR light without such filter 404. For example, a filter 404 configured to only allow SWIR light to enter the lens 402 may reduce the amount of visible energy from outside the lens to be captured by the sensor, and as such the only significant amount of visible light to hit the sensor may be visible light created by a conversion layer.

Figure 7A:
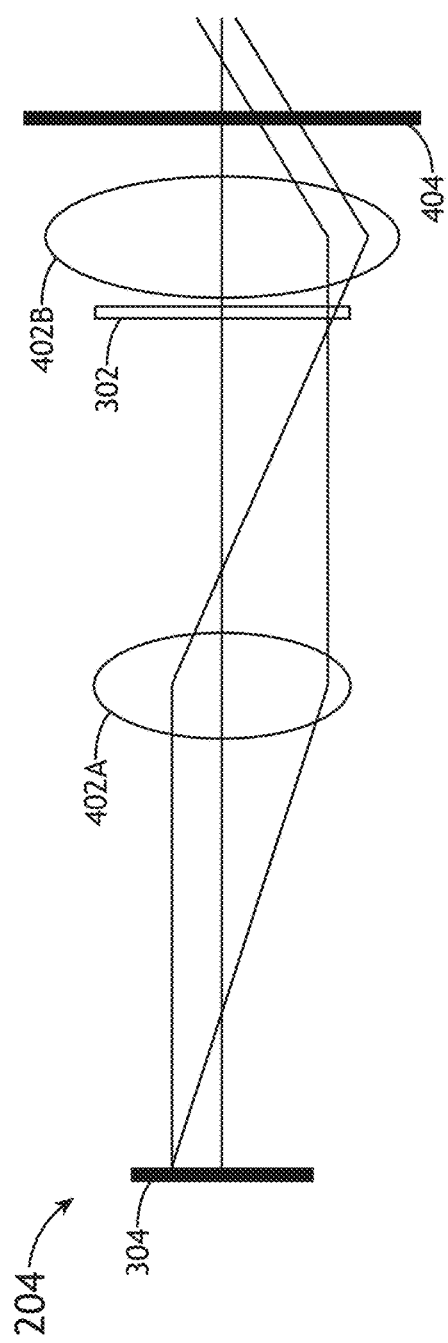
FIGS. 7A and 7B are views of exemplary embodiments of a sensor assembly having two lenses according to the inventive concepts disclosed herein.

Now referring to FIG. 7A, FIG. 7A shows an explementary embodiment of a sensor assembly 204 including two lenses 402A, 402B. For example, a first lens 402B may be positioned between a filter 404 and a conversion layer 302. A second lens 402A may be positioned between the conversion layer 302 and the image sensor 304. The first lens 402B may focus emitted light to an intermediate image plane creating an inverted image, where the conversion layer 302 may be positioned. The converted light may then be focused onto the image sensor 304 by the second lens 402A. This embodiment may permit the conversion layer 302 to be placed further from the image sensor. For example, such an embodiment may accommodate situations where it is not easy (or not possible) to place the conversion layer 302 closer to the image sensor 304.

Figure 7B:
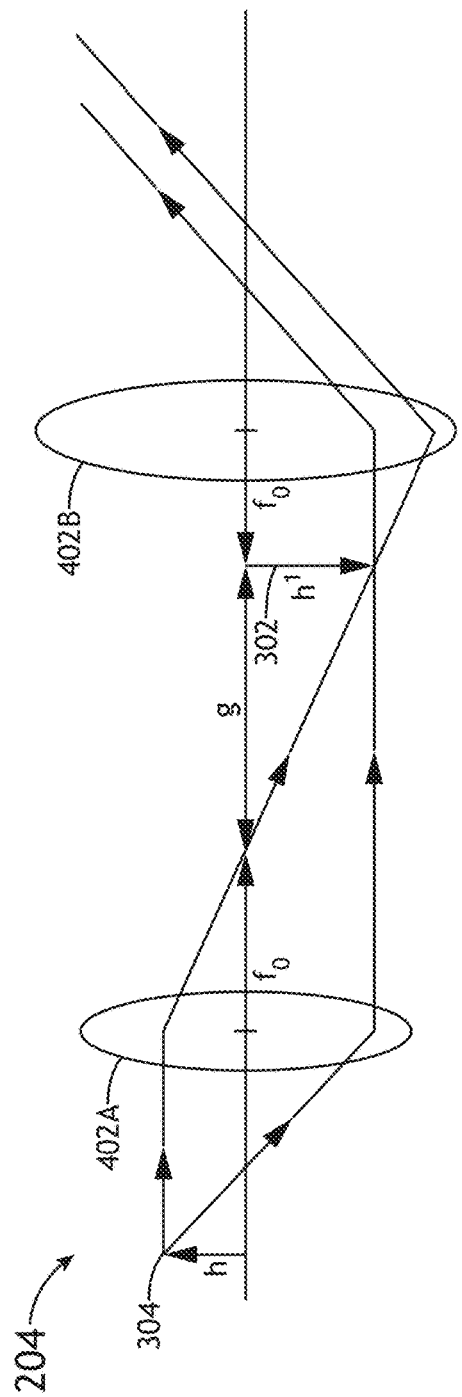

Referring to FIG. 7B, FIG. 7B shows an exemplary path of light of an exemplary embodiment, which may be similar to the exemplary embodiment of FIG. 7A.

Figure 8:
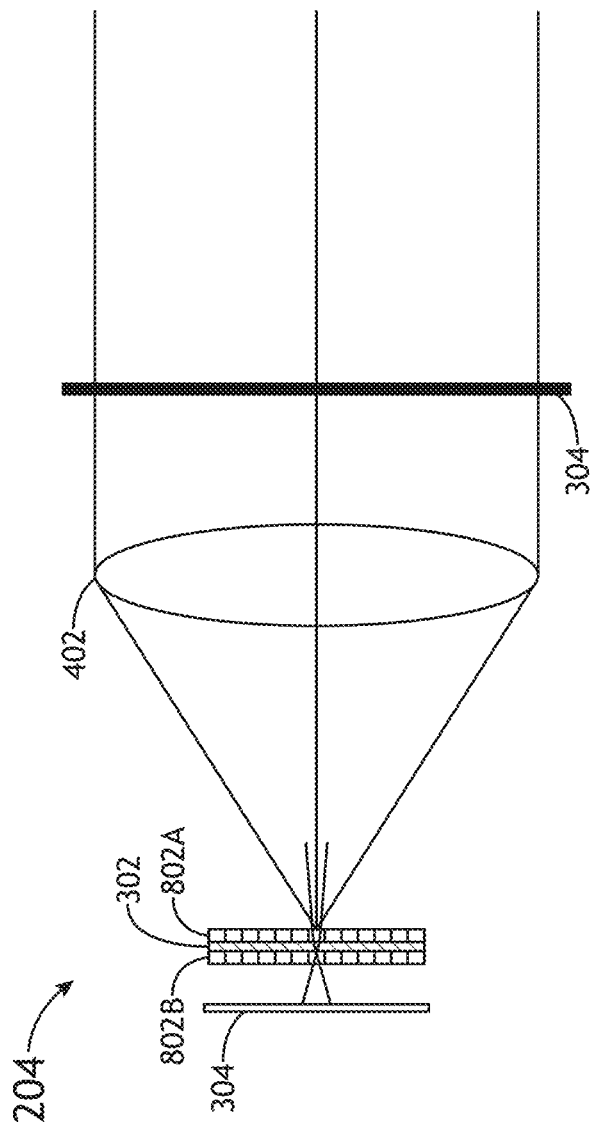
FIG. 8 is a view of an exemplary embodiment of a sensor assembly having a pair of microlens arrays according to the inventive concepts disclosed herein.

Now referring to FIG. 8, FIG. 8 an explementary embodiment of a sensor assembly 204 having a pair of microlens arrays 802A, 802B is shown. In some embodiments, each microlens array may be a one- or two-dimensional array of microlenses (e.g., small lens). For example, each microlens array may include thousands of microlenses. One microlens array 802A may be positioned on one side of the conversion layer 302, and a second microlens array 802B may be positioned on the other side of the conversion layer 302. In some embodiments, the pair of microlens arrays 802A, 802B may prevent the converted light from re-emitting in every direction, and instead relay and/or focus, the converted light to the image sensor 304 resulting in a less blurred (e.g., less blurred, high resolution) image.

In some embodiments, the sensor assembly 204 may include a fiber face plate. The fiber face plate may be a transparent plate consisting of many optical fibers. The fiber face plate may include an input face and an output face, with the many optical fibers connecting the input face to the output face. The use of the optical fibers may permit the fiber face plate to transfer an one-to-one image, or an image without distortion. For example, the conversion layer 302 may be positioned on the input face of the fiber face plate and the output face of the fiber face plate positioned in close proximity to the image sensor 304. For example, converted light may be prevented from re-emitting in every direction, and pass through the fiber face plate to maintain a one-to-one image, resulting in a less-blurred (e.g., a less-blurred, high resolution) image.

In some embodiments, the sensor assembly 204 may include a fiber face plate and a microlens array. The conversion layer 302 may be positioned on the input face of the fiber face plate and the output face of the fiber face plate positioned in close proximity to a microlens array. The microlens array may then relay the converted light to the image sensor 304, resulting in a less-blurred (e.g., less-blurred, high resolution) image.

Figure 5B:
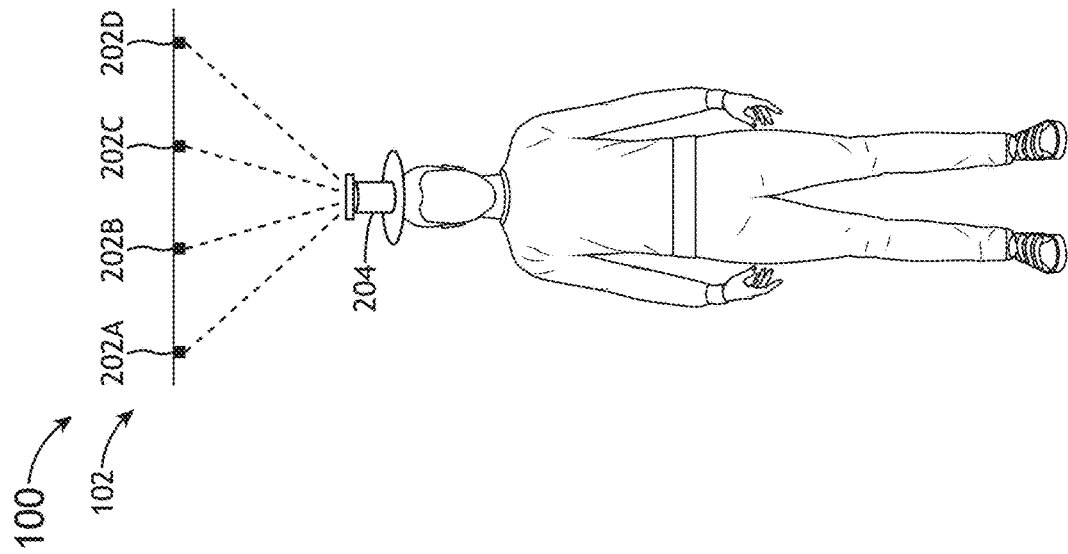
FIG. 5B is a view of an exemplary embodiment of an inside-looking out tracking system according to the inventive concepts disclosed herein.
Figure 5A:
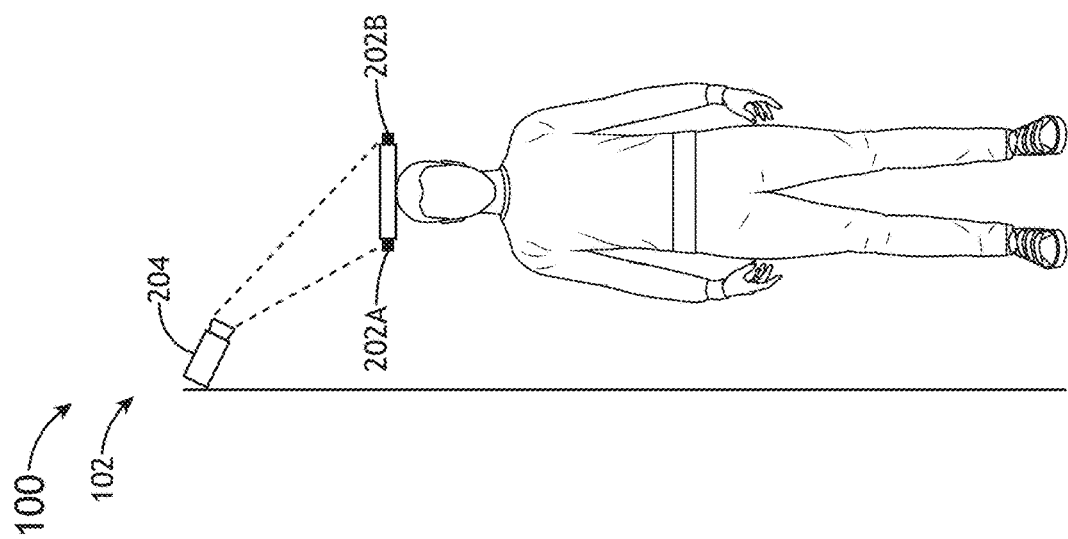
FIG. 5A is a view of an exemplary embodiment of an outside-looking in tracking system according to the inventive concepts disclosed herein.
Figure 9B:
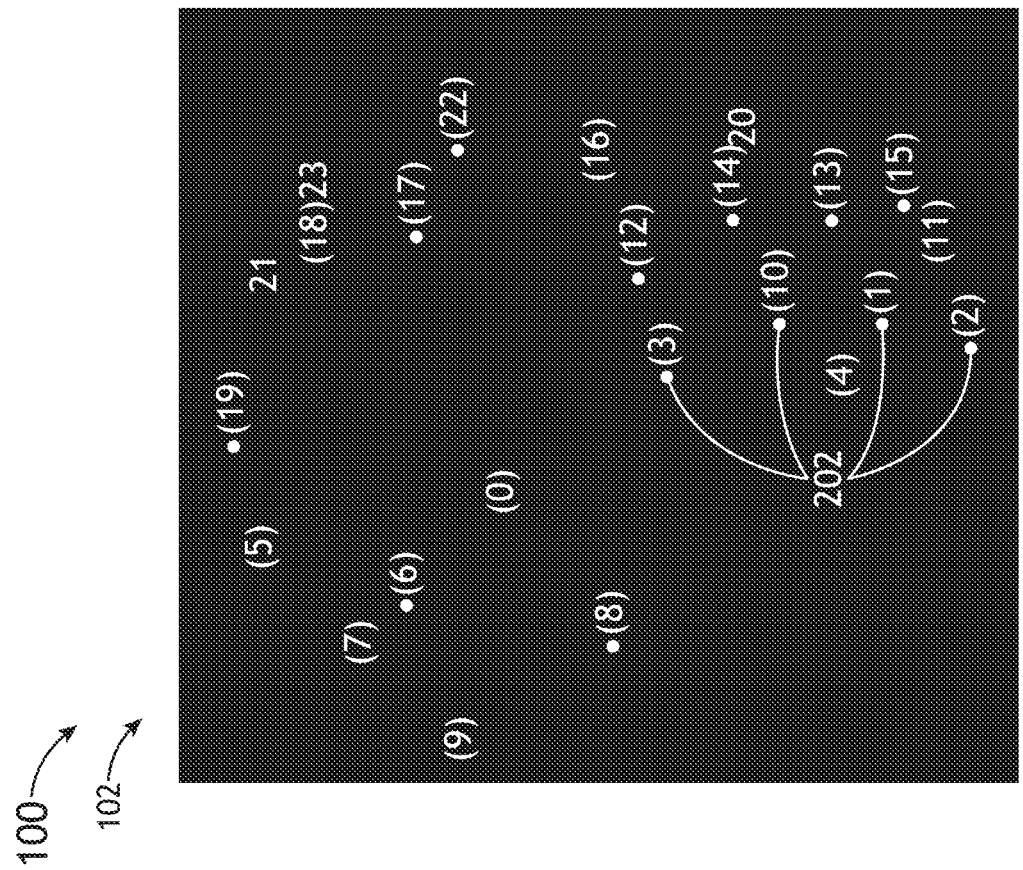
FIG. 9B is a view of an exemplary embodiment of captured images of the head-wearable device of FIG. 9A according to the inventive concepts disclosed herein.
Figure 9A:
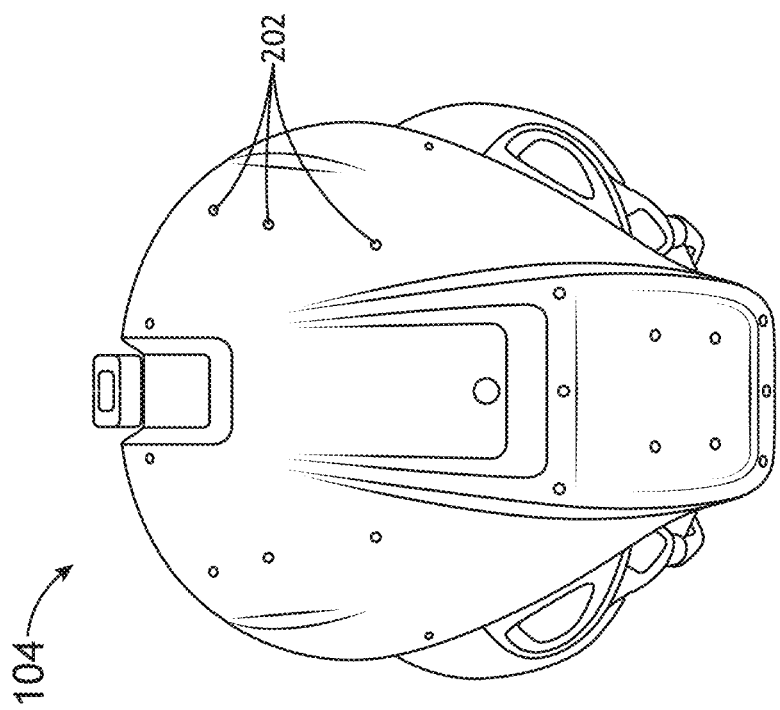
FIG. 9A is a view of an exemplary embodiment of a head-wearable device according to the inventive concepts disclosed herein.

Now referring to FIG. 5A, in some embodiments, the head and/or eye tracking system 106 may be outside looking-in, wherein the head and/or eye tracking system 106 may include at least one sensor assembly 204 fixed to an environment (e.g., on a surface of a cockpit of the aircraft 102) and light emitters (e.g. 202A and/or 202B) fixed on a head wearable device (e.g., 104). As illustrated in FIGS. 9A and 9B, the head wearable device (e.g., 104) may have multiple light emitters 202 fixed to such device worn on a head (e.g., a visor or a helmet). The head and/or eye tracking system 106 may determine the position of the light emitters 202 when the sensor assembly 204 receives and detects the emitted light, which may be captured and output as an image, as illustrated in FIG. 9B.

Now referring to FIG. 5B, in some embodiments, the head tracking system may be one of inside-looking out, wherein the head tracking system including at least one sensor assembly 204 fixed to a head wearable device (e.g., 104) and light emitters (e.g., 202A and/or 202B) fixed on an environment (e.g., on a surface of a cockpit of an aircraft 102).

Figure 12:
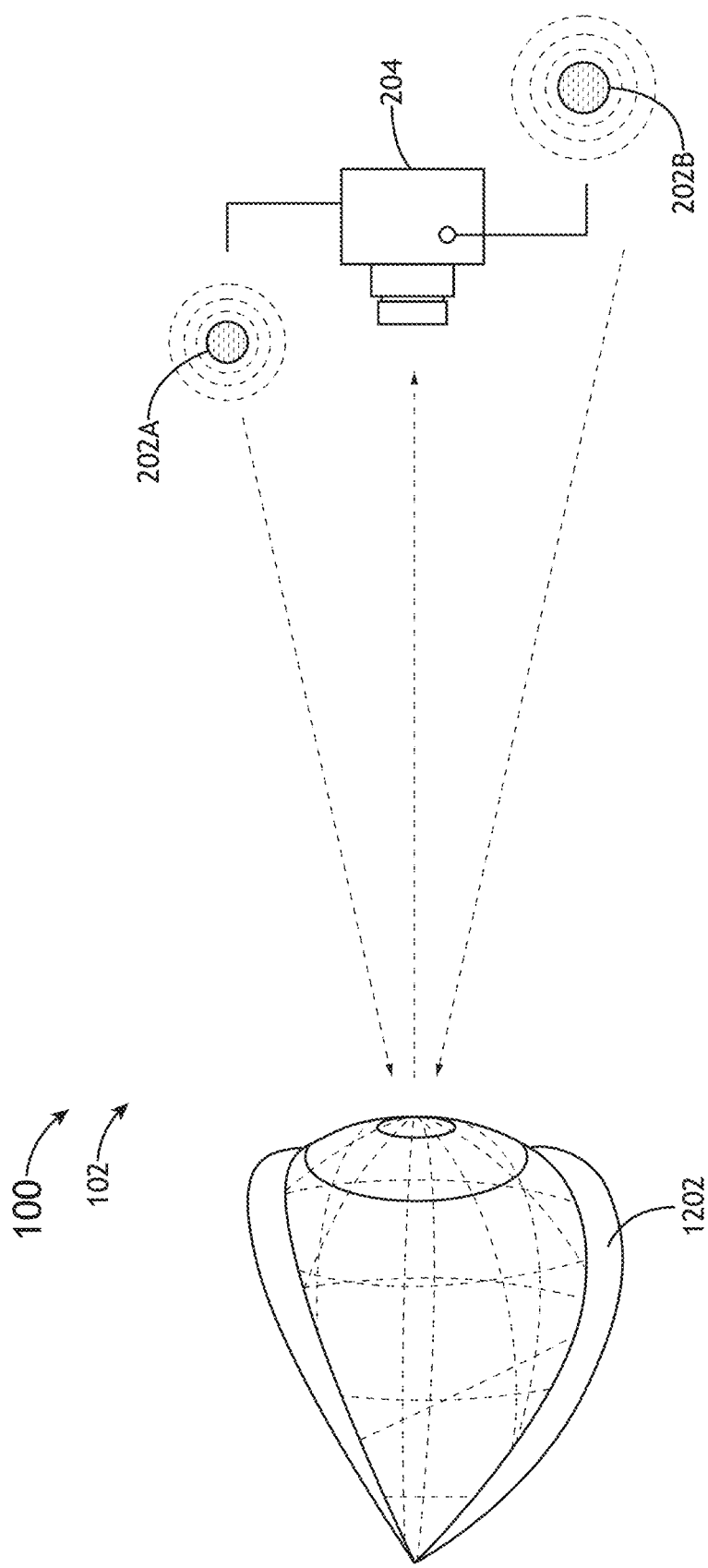
FIG. 12 is a view of an exemplary embodiment showing an eye tracking system according to the inventive concepts disclosed herein.

Now referring to FIG. 12, FIG. 12 illustrates a head and/or eye tracking system as an eye tracking system. The at least one light emitters 202A and/or 202B may emit light above the NVIS-detectable range of wavelengths (e.g., emitted light being SWIR light). The emitted light may reflect off an eye 1202 and be received by at least one sensor assembly 204. The at least one conversion layer 302 of the sensor assembly 204 may be an up-conversion layer and may permit the emitted SWIR light to be converted into a higher range of wavelengths detectable to the image sensor 304, so as to capture an image. The resulting captured image and image data may be outputted to the at least one processor 206 and/or used to track the orientation and movements of the eye 1202.

As will be appreciated from the above, embodiments of the inventive concepts disclosed herein may be directed to a method and a system, which may include at least one light emitter and at least one sensor assembly having at least one sensor and at least one conversion layer (e.g., configured to up-convert and/or down-convert emitted light from light emitter(s)).

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    at least one light emitter, each of the at least one light emitter configured to emit light over at least one range of wavelengths onto an environment, wherein each of the at least one light emitter is compatible with a night vision imaging system (NVIS) configured to detect light in an NVIS-detectable range of wavelengths, wherein each of the at least one light emitter is configured to only emit light at wavelengths at least one of above or below the NVIS-detectable range of wavelengths; and
    at least one sensor assembly including a first sensor assembly, the first sensor assembly comprising:
        at least one image sensor including a first image sensor, the first image sensor configured to capture images of the environment illuminated by the at least one light emitter, the first image sensor further configured to sense light in at least one given range of wavelengths; and
        at least one conversion layer including a first conversion layer, the first conversion layer configured to: receive the emitted light from one or more of the at least one light emitter; and
        at least one of up-convert or down-convert the emitted light to be converted light, wherein the converted light is within the at least one given range of wavelengths associated with the first image sensor;
    wherein the first image sensor is further configured to: receive the converted light from the first conversion layer; capture an image of one or more of the at least one light emitter; and output image data associated with the captured image.

2. The system of claim 1, wherein the NVIS-detectable range of wavelengths includes at least part of the visible spectrum and/or at least part of the near-infra red (NIR) spectrum.

3. The system of claim 2, wherein the at least one range of wavelengths associated with the at least one light emitter includes at least part of the short-wave infrared (SWIR) spectrum and/or at least part of the ultraviolet (UV) spectrum.

4. The system of claim 3, wherein the at least one range of wavelengths associated with the at least one light emitter includes the at least part of the short-wave infrared (SWIR) spectrum, wherein the first conversion layer is configured to up-convert the emitted light.

5. The system of claim 3, wherein the at least one range of wavelengths associated with the at least one light emitter includes the at least part of the ultraviolet (UV) spectrum, wherein the first conversion layer is configured to down-convert the emitted light.

6. The system of claim 3, wherein the at least one given range of wavelengths associated with the first image sensor includes at least part of the visible spectrum and/or at least part of the near infrared (NIR) spectrum.

7. The system of claim 1, further comprising at least one processor communicatively coupled to the first image sensor, the at least one processor configured to: receive the image data associated with the captured image.

8. The system of claim 7, wherein the conversion layer causes the captured image to include blurred imagery for each of the one or more of the at least one light emitter, wherein the at least one processor is further configured to determine a location for each of the one or more of the at least one light emitter within the captured image by determining, for each of the blurred imagery, a center of a given blurred imagery of a given light emitter of the one or more of the at least one light emitter.

9. The system of claim 1, wherein the first sensor assembly further comprises at least one lens including a first lens, wherein the first image sensor has a focal plane, wherein the first lens is configured to at least partially focus one of the emitted light or the converted light.

10. The system of claim 9, wherein the first lens is positioned between the first image sensor and the first conversion layer, wherein the first lens is configured to at least partially focus the converted light on the focal plane of the first image sensor.

11. The system of claim 9, wherein the first conversion layer is positioned between the first image sensor and the first lens, wherein the first lens is configured to focus the emitted light such that the converted light is at least partially focused on the focal plane of the first image sensor.

12. The system of claim 9, wherein the at least one lens further includes a second lens.

13. The system of claim 9, wherein the first sensor assembly further comprises a filter configured to filter out some wavelengths of light with respect to the emitted light before the emitted light reaches the first lens.

14. The system of claim 1, wherein the first conversion layer is a cover glass of the first sensor assembly, the cover glass configured to cover the first image sensor.

15. The system of claim 14, wherein the first conversion layer is a nanocrystal doped glass.

16. The system of claim 1, wherein the first sensor assembly further comprises a cover glass, the cover glass configured to cover the first image sensor, wherein the first conversion layer is deposited on or adhered to the cover glass.

17. The system of claim 1, wherein the first conversion layer comprises at least one of phosphors or nanoparticles.

18. The system of claim 1, wherein the first sensor assembly further comprises a microlens array pair comprising a first microlens array positioned on a first side of the first conversion layer and a second microlens array positioned on a second side of the first conversion layer, wherein the microlens array pair is configured to relay a high-resolution image formed on the first conversion layer to the first image sensor.

19. The system of claim 1, further comprising a tracking system, the tracking system being a head tracking system or an eye tracking system, the head tracking system comprising the at least one light emitter and the at least one sensor assembly.

20. The system of claim 1, further comprising a head wearable device, the head wearable device comprising either the (a) the at least one light emitter or (b) the at least one sensor assembly.

* * * * *